Feb. 11, 1947.  A. RAPPL  2,415,565
POWER OPERATED WINDOW UNIT FOR MOTOR VEHICLES
Filed Oct. 6, 1943    3 Sheets-Sheet 3
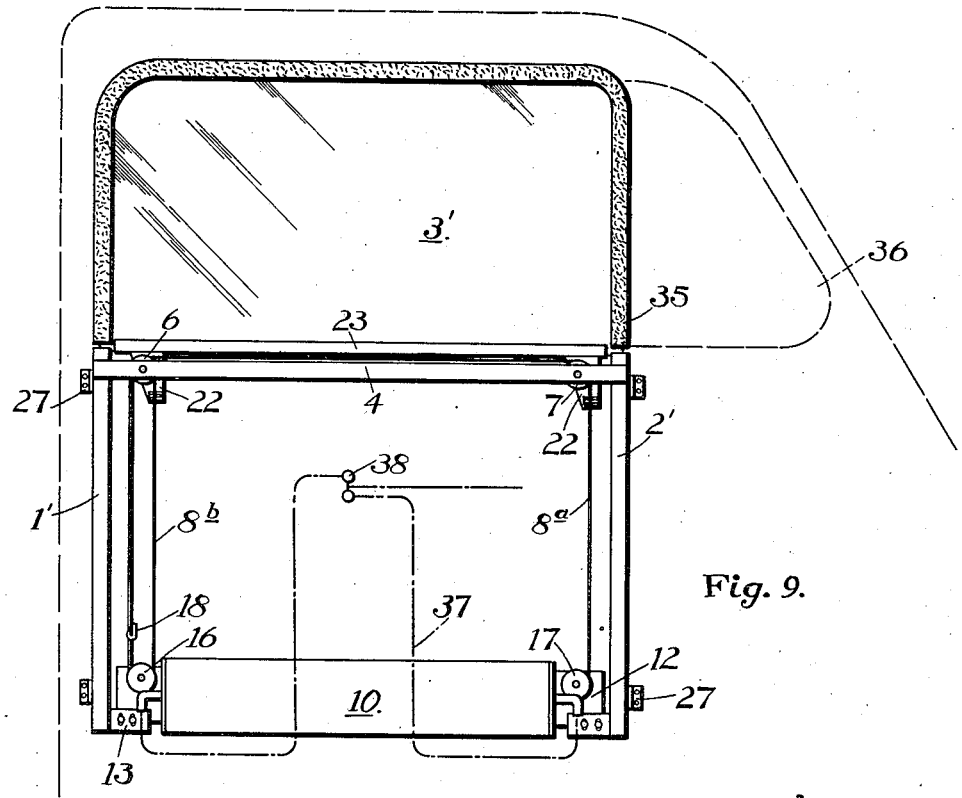
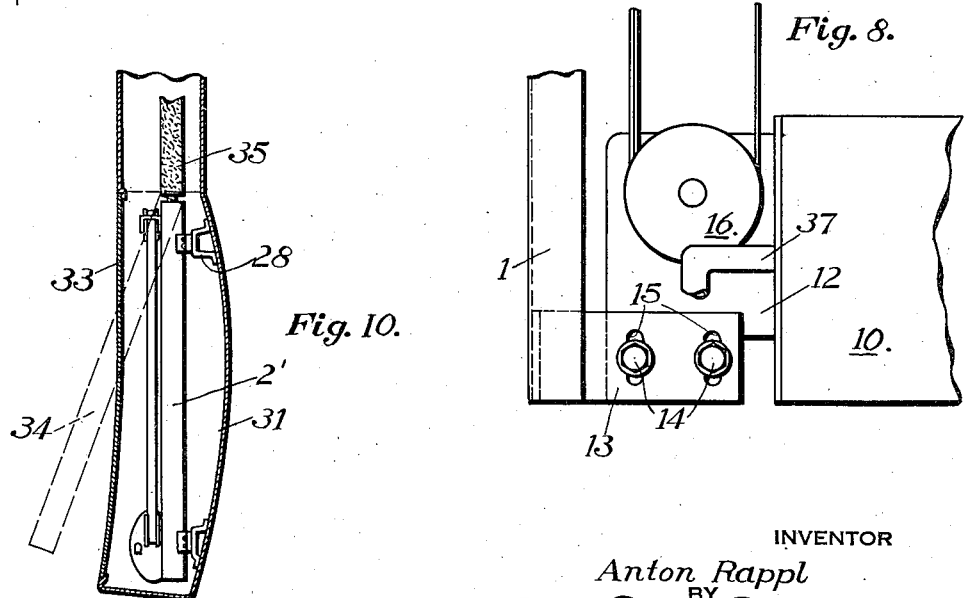
INVENTOR
*Anton Rappl*
BY
*Beau, Brooks, Buckley & Beau.*
ATTORNEYS Patented Feb. 11, 1947

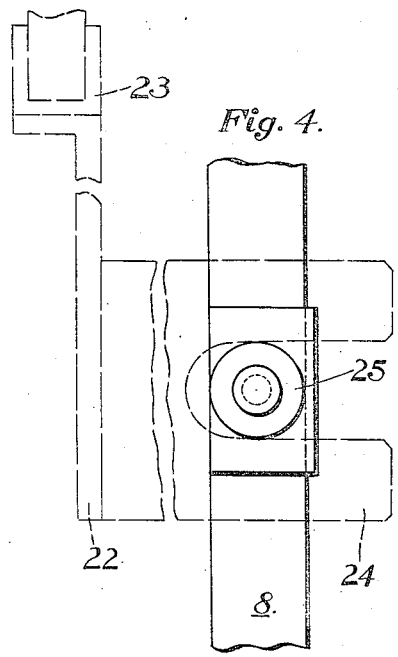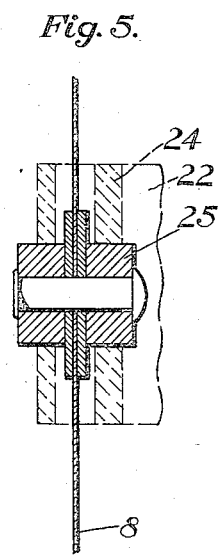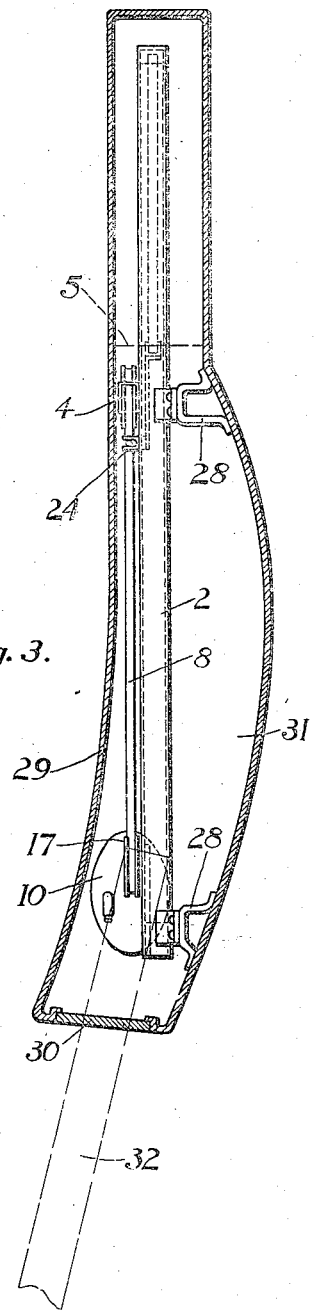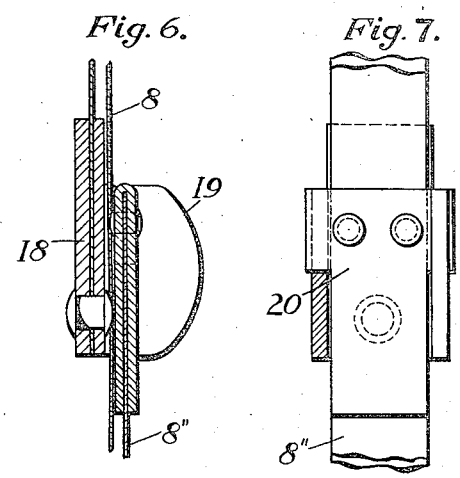

2,415,565

UNITED STATES PATENT OFFICE 2,415,565

POWER-OPERATED WINDOW UNIT FOR MOTOR VEHICLES

Anton Rappl, Eggertsville, N. Y., assignor to Trico Products Corporation, Buffalo, N. Y.

Application October 6, 1943, Serial No. 505,177

13 Claims. (Cl. 296—44)

This invention relates to a motor vehicle and primarily to a window installation thereof.

In the fabrication of a motor vehicle the window panels are slidably mounted in vertical guides which are fixed, as by spot welding, in a window well of the wall structure of the vehicle. The window support comprises a pair of opposed metal channels fixed in the window well below the sill thereof. Of late some attention has been given to the employment of a power unit by which the window may be lowered to an open position or raised to a closed position. In mounting the motor considerable care must be given to avoid misalignment of parts of the window system which would cause unnecessary binding or even breakage of the window panel. Because of the limited space in which to work while assembling the several parts within the well it is exceedingly difficult to effect the desired window installation. Furthermore, the slow progress made in such confined quarters increases the cost of installation per window.

An object of the present invention is to provide a prefabricated window unit which is efficient in operation and one which will facilitate the installation of the window system and thereby curtail the time and expense heretofore involved for such installation. A further object of the invention is to provide a readily mountable and demountable window unit in which the component and essential operating parts thereof are prearranged in a definite and fixed relation against destructive wear and tear. Further the invention has for its object to provide a power operated window unit which is practical, durable and simplified, all tending toward economy in manufacture and efficiency in operation.

In the drawings

Fig. 3 is a vertical section through the vehicle door showing the unit mounted therein;

Figure 1:
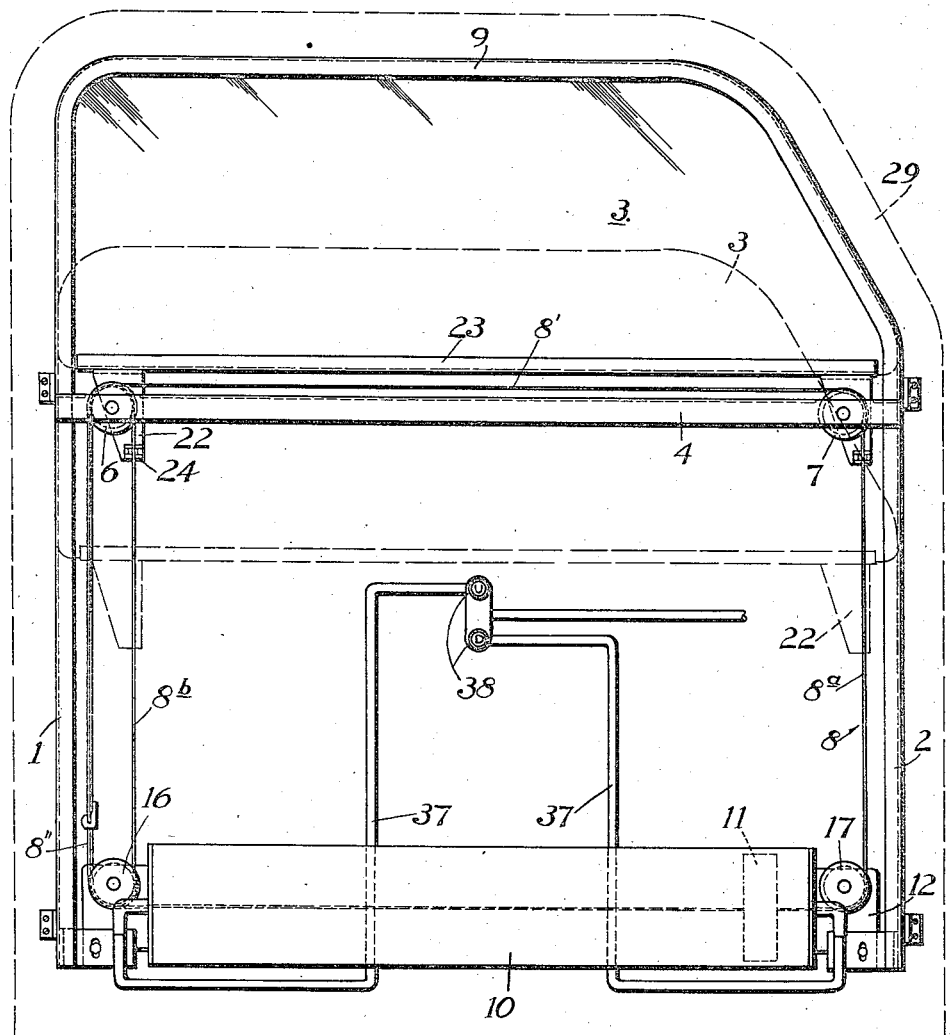
Fig. 1 is a diagrammatic view depicting the power operated window unit ready for placement within the vehicle door, the latter being outlined by the broken lines.
Figure 2:
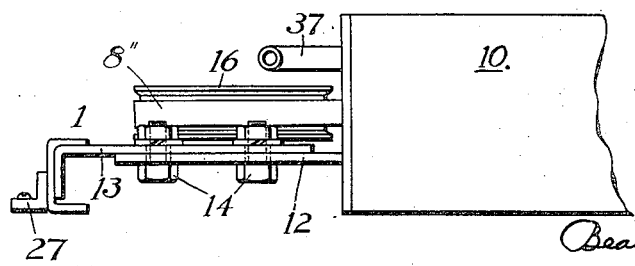
Fig. 2 is a fragmentary bottom plan view of the lower left hand corner of the window unit.

Figs. 4, 5, 6, and 7 are detailed views showing more particularly the belt drive of the unit and its relation to the window panel;

Fig. 8 is a fragmentary front elevation of the lower left hand corner of the unit;

Fig. 9 is a view similar to Fig. 1 but showing a modified form of the window unit; and Fig. 10 is a fragmentary vertical sectional view through the door of the modified embodiment.

Referring more particularly to the drawings, the numerals 1 and 2 designate the vertical side channel rails constituting the guideways for slidably supporting the transparent window panel 3. These guideways are braced by a self-sustaining transverse frame member 4 at a point immediately beneath the window sill indicated at 5 in Fig. 3. This frame member may likewise be channeled or of angle-iron design and is provided for giving support to the upper pulleys 6 and 7 over which the flexible belt 8 takes. The opposed guideways 1 and 2 may be extended above the transverse frame member to follow the contour of the window opening and thereby impart a substantially U-shape to the continuous side rail formation with the top cross portion 9 serving as a second transverse frame member for bracing the window frame.

Bracing the lower ends of the guideways and constituting a third transverse frame member for the window support is a power unit herein depicted as being in the form of an air motor comprising a cylinder 10 and a piston 11. The opposite ends of the cylinder, which term comprehends any practical design of piston chamber, are directly connected to and supported by the guideways 1 and 2 as by the brackets 12 on the cylinder and the brackets 13 on the guideways. These bracket parts 12 and 13 may be detachably connected by suitable fasteners such as the bolts 14 which may pass through vertical slots 15 in such parts to permit of adjustment of the motor unit in controlling the slack in the belt. The power belt 8 has portions 8' and 8" attached to and extending from the opposite sides of the piston 10 and through suitable packing glands in the ends of the cylinder from whence the belt portions take over pulleys 16 and 17, journaled on the brackets 12. The belt portion 8' passes upwardly from its pulley 17 and over pulleys 7 and 6, thence downwardly and about pulley 16 beneath the belt portion 8" and finally upwardly and again over the pulley 6 beneath the belting thereon. This disposes the free ends of the two portions on the opposite sides of an intermediate part. A cross-over coupling joins the two terminals, the coupling comprising a clip 18 having ears 19 which straddle the intermediate part for being interlockingly engaged by a clip 20, the two clips secured to the two terminals. By this arrangement two active flights or sections 8a and 8b are provided, these flights being supported substantially parallel and in a vertical direction for movement in unison up and down.

These parallel flights 8a and 8b are connected to the window panel 3 by a pair of brackets 22 which latter depend from the window carried border strip 23. Each bracket has a bifurcated arm 24 straddling the respective active flight and interlockingly engaging with the rollers or lugs 25 thereon preferably with a slight lateral play, as shown. The pulleys constitute supporting guides for the belt and therefore any reference to the pulleys hereinafter will comprehend other practical and suitable supporting means by which the active flights are properly disposed to actuate the window panel. The slots 15 enable slight adjustment of the power unit to take up slack in the belt without impairing the bracing action of the lowermost transverse frame member or influencing the parallelism of the guideways. Furthermore, the motor may be removed for repair independently of the unit by simply removing the bolts 14.

The power operated window unit thus described provides a rigid window frame and unitary structure in which the window and its operating motor are definitely related. The transverse frame member, as provided by the motor, is therefore chambered to enclose the piston but a reversal of these parts may be made wherein the piston is rigid with the side guides and the cylinder slides thereon, the flexible belt being connected to the cylinder. This window unit is readily mountable and demountable within the wall structure to insure proper placement and may thereafter be secured by suitable means, such as the angle brackets 27, which may be either permanently or detachably secured to prepared seats in the form of the mounting pads 28 on the vehicle wall structure or body. By detachably mounting the window unit in the body fabrication, the window unit may be prefabricated to facilitate its assembly and secure a nicety of operation free of any binding and unnecessary wear which is consequential to any misalignment between the parts. After this preliminary step of assembling the window unit, the latter is placed within the wall structure of the vehicle, such as the door 29 as by inserting the unit into the well 31. In Fig. 3 this is accomplished by introducing the unit through an entranceway in the bottom wall of the door, as indicated at 32, or it may be introduced through a side entranceway, as indicated at 34 in the modified embodiment of Fig. 10. The bottom entranceway may be closed by a plate 30, while the side panel 33 of the door will serve to enclose the unit placed through the side entranceway. The side panel may be the entire inner side wall of the door.

In this modification the window unit is of similar construction as that disclosed in Fig. 1 with the exception that the metal channel guideways 1' and 2' terminate below the window sill, and a cushioning felt channeled seat 35 is used about the window opening to cushion the window as it moves to its fully closed position. The felt guide may extend into full contact wtih the ends and constitute continuations of the channel guides 1' and 2'. In the illustration of Fig. 9 the felt strip will be supported by the usual mullion between the ventilating wing 36 and the slidable window section 3'.

The felt channeled seat 35, being separate from the guide rails 1' and 2', may be removed. This may be desirable in instances where it is desired to replace the window panel alone. For instance if the window panel is cracked or broken, it can be lowered between the guide rails 1' and 2' and thereafter the movable section 35 of the window guideway may then be removed, following which the panel will be elevated to the position shown in Fig. 9 whereupon the panel may be rocked inwardly to disengage the arms 24 from the belt lugs 25.

While the motor may be of any desired type and operable electrically or hydraulically, the one illustrated in the drawings is of the air pressure type and may be operated from a source of superatmospheric pressure or from the intake manifold of the engine or other source of sub-atmospheric pressure, the opposite ends of the piston chamber being connected by conduits 37 in which are arranged the control valves 38.

From the foregoing it will be observed that by the reason of the prefabrication of the window unit, the several parts may more easily be arranged and secured in their proper relationship against binding; that the window system is therefore economically assembled and installed in the vehicle wall in a manner which will insure proper window movement; that the window guides constitute the support for the motor or power drive and thereby position the motor correctly for the greatest efficiency by the proper application of the power to the window; that the motor constitutes a bracing frame member of the window frame in which the window is disposed; and that by reason of the unitary incorporation of the window and its drive the possibility of misalignment during installation in the wall structure is reduced to a minimum if not completely avoided.

The window unit in accordance with the present invention is practical and readily installed as a unit following which the closure, such as the side door panel, will be placed in position. The unit is durable in that the side rails serve a dual purpose of guiding the window panel as well as supporting the power mechanism, while the power mechanism likewise serves a dual function in that it constitutes a strut or frame member which acts as a sustaining spacer below the lower ends of the guideways.

While the foregoing description has been given in detail, it is not the intention to restrict the invention beyond the scope set forth in the appended claims since the inventive principles involved are capable of assuming other physical embodiments without departing from the spirit of the invention.

What is claimed is:

1. A motor vehicle having a wall structure with a window opening and an adjoining well, the latter having an entranceway and a closure panel therefor removable to give access to the well, a window unit mountable and demountable through the entranceway in the well, said window unit comprising a window frame having opposed side guideways for slidably receiving a transparent panel, transverse sustaining frame members bracing the side guideways, power operated means carried by the window frame as a part of the window unit, pulleys journaled on the window frame, flexible means supported by the pulleys and operatively connected to the power operated means for being moved thereby back and forth, said flexible means carrying a part for supporting and moving such transparent panel in the side guideways, and means detachably securing the window unit to the wall structure within the well.

2. A motor vehicle having a wall structure with a window opening and an adjoining well communicating therewith through a slot in a window sill, an entranceway beneath the sill and a closure panel for the entranceway removable to give access to the well while leaving the sill intact, a window unit mountable and demountable through the entranceway in the well, said window unit comprising a window frame having opposed side guideways for slidably receiving a transparent panel, a power unit supported by the opposed guideways and constituting a transverse sustaining frame member for and between the latter, flexible means operatively connecting the power unit to such transparent panel and serving to support the latter during movement in the guideways to open and close the window opening, and means mounting the window unit in the well of the wall structure.

3. In a motor vehicle having a wall structure with a window opening and an adjoining window well, a window panel, spaced guide rails depending within the well and slidably supporting the panel, a power mechanism suspended within the well by said guide rails, and means operatively and detachably connecting the power mechanism to the panel, the guide rails having a removable section for guiding the panel across the window opening, said section being removable to enable replacement of a broken panel.

4. In a motor vehicle having a wall structure with a window opening and an adjoining window well, a window panel, spaced guideways arranged in the well and slidably supporting the panel, means supporting the guideways apart at one end in the well, a power mechanism supported by the guideways at their opposite ends, spaced pairs of pulleys arranged on said means and said mechanism between the guideways, spaced vertically disposed flexible members taking over and supported by said pulleys, said flexible members being connected to the mechanism for being reciprocated thereby, said means and said mechanism together with said pulleys and flexible members constituting a stabilizing unit for the panel installed as an entirety, and means removably supporting the panel on said flexible members for moving the panel to and from a closed position in the window opening.

5. A window unit comprising a window frame having opposed window guideways slidably supporting a window panel and joined by transverse frame members, one of said frame members constituting the stationary part of a fluid motor having relatively movable cylinder and piston parts, and means operatively connecting the movable part of the motor to the window panel.

6. A window unit comprising a window frame having opposed window guideways slidably supporting a window panel and joined by transverse frame members, one of said frame members being chambered, a piston member movable back and forth in the chamber of the frame member, and means operatively connecting the piston member to the window panel for moving the latter along the guideways.

7. In a motor vehicle having a wall structure with a window opening and an adjoining window well, spaced guideways arranged in the well slidably supporting a window panel, a frame member connecting the spaced guideways, a motor having cylinder and piston parts, one of the motor parts connecting the spaced guideways and serving as a second frame member, said frame members and guideways constituting a window frame, the other motor part being movable by fluid pressure, flexible power transmitting means operatively connected to the opposite sides of the movable part, means on the window frame operatively supporting the flexible means, and means operatively connecting the flexible means to the window panel to actuate the latter.

8. A motor vehicle having a wall structure with a window opening and an adjoining well, a transparent panel, guideways in the window opening for receiving the panel when in a closed position, a removable closure giving access to the well, a bodily mountable window unit in the well comprising a window frame having opposed channel guideways registrable with the first guideways to receive the panel therefrom when moving to an open position, transverse sustaining frame members fixedly connecting the opposed guideways and forming therewith the window frame, flexible power transmitting means supported by the window frame between the guideways and carrying parts for supporting such transparent panel to so move the same, a power drive for the flexible means carried by the window frame and with the latter and said flexible means comprising the window unit for installation as an entirety in the well whereby the prefabricated relationship between the panel supporting parts, the drive and the opposed guideways is maintained upon placement of the unit within the well, and means on the unit by which the latter is mounted to so register the opposed guideways with the first guideways.

9. A motor vehicle having a wall structure with a window opening having rigid guideways and an adjoining well separated from the opening by a sill, a closure giving access to the well, a window panel in the guideways, a bodily mountable window operator unit in the well comprising a frame having opposed channel guideways registering with the first guideways and slidably receiving the window panel therefrom during a window opening movement, transverse sustaining frame members fixedly connecting the opposed guideways and forming therewith a rigid frame, a power operated member supported on the frame, supporting means on a second frame member, flexible means connected to the power operated member and operatively disposed by said supporting means with respect to the opposed guideways, means operatively connecting the flexible means to the window panel for so moving the same, said window frame together with the power operated means and the operatively supported flexible means constituting a prefabricated window operating unit to which the transparent panel is flexibly connected when in a window closed position, and means for mounting the window unit in the well.

10. A bodily mountable window unit for insertion within the wall structure of a motor vehicle, comprising side frame members for slidably receiving a transparent panel and braced apart by a transverse frame member in the form of a fluid motor to form a rigid structure, the motor having a piston and cylinder, a panel actuating member operatively supported on the rigid structure to be definitely related to the side frame members and operatively connected to the fluid motor for being moved back and forth thereby, and means on the window unit for mounting the same in the wall structure.

11. A vehicle wall having a window opening with guideways supporting a window panel for movement thereacross, said wall also having a well separated from the window opening by a sill, a bodily mountable window unit fitted within the well and comprising a window frame having side frame members slidably receiving the panel from said guideways for guided movement in a definite path and braced apart in a rigid frame structure, a pair of flexible panel supporting members movable to so slide the panel on the side frame members, means on the frame structure operatively supporting the flexible members adjacent the respective side frame members, and means carried by the frame structure for actuating the flexible panel supporting members to move the panel from the guideways onto said side frame members.

12. A motor vehicle wall structure having a window opening and an adjoining well having an entranceway, seats within the well, and a window operator unit insertible through the entranceway into the well and mounted upon the seats, said unit comprising spaced guideways, a window panel slidable on the latter, cross members bracing the guideways apart to form a rigid frame, one of the cross members constituting the cylinder of a fluid motor, a piston reciprocable in the cylinder, an endless flexible member including the piston for being pulled thereby first in one direction and then in the opposite, means on the cross members supporting the flexible member to provide spaced active flights one adjacent each guideway in parallelism, and means on each flight supporting the panel therefrom whereby the panel is given a balanced and flexible driving support conformable to the rigid guideways.

13. A window operator for insertion as a unit in a chambered wall of a motor vehicle, comprising a rigid frame having opposed and fixed side frame members giving sustaining support to a window panel, a flexible panel supporting member, means providing four points of support for the flexible member and being arranged on the rigid frame at the upper and lower ends of the side frame members to define a pair of parallel active flights one adjacent each side frame member, a fluid motor having a cylinder and piston, the cylinder carried by the rigid frame and serving as a sustaining spacer between the lower ends of the opposed side frame members, the piston being inserted in the flexible member to form in effect an endless window actuating member, and means on the two active flights giving balanced support to the panel whereby the weight of the latter is supported by the side frame members under compression, the active flights providing flexible support for the panel when moving in a path alongside the fixed side frame members, said rigid frame having portions engageable with seats within the chambered wall of the vehicle.

ANTON RAPPL.

REFERENCES CITED

The following references are of record in the file of this patent:

UNITED STATES PATENTS

| Number | Name | Date |
|---|---|---|
| 1,145,623 | Sinnott | July 6, 1915 |
| 2,093,201 | Love | Sept. 14, 1937 |
| 2,076,938 | Chandler | Apr. 13, 1937 |
| 1,919,671 | Shetzline | July 25, 1933 |
| 2,003,614 | Shetzline | June 4, 1935 |
| 1,714,979 | Goldsmith et al | May 28, 1929 |
| 2,262,644 | Mackey | Nov. 11, 1941 |
| 2,361,609 | Doty | Oct. 31, 1944 |

FOREIGN PATENTS

| Number | Country | Date |
|---|---|---|
| 297,898 | British | Oct. 4, 1928 |
| 362,668 | British | Dec. 10, 1931 |
| 174,252 | Swiss | Mar. 16, 1935 |
| 328,796 | British | May 8, 1930 |